United States Patent
Sun (10) Patent No.: US 8,335,283 B1
(45) Date of Patent: Dec. 18, 2012

(54) WEAK SIGNAL DETECTION IN WIRELESS COMMUNICATION SYSTEMS

(75) Inventor: Qinfang Sun, Cupertino, CA (US)

(73) Assignee: Qualcomm Atheros, Inc., San Jose, CA (US)

(*) Notice: Subject to any disclaimer, the term of this patent is extended or adjusted under 35 U.S.C. 154(b) by 893 days.

(21) Appl. No.: 12/268,550

(22) Filed: Nov. 11, 2008

(51) Int. Cl.
H03D 1/00 (2006.01)

(52) U.S. Cl. .................. 375/343; 375/340; 375/316

(58) Field of Classification Search ............ 375/347, 375/365, 343; 370/208
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,724,834 | B2 * | 4/2004 | Garrett et al. | 375/317 |
| 6,993,100 | B2 * | 1/2006 | Yang et al. | 375/342 |
| 7,194,055 | B2 * | 3/2007 | Tandai et al. | 375/368 |
| 7,366,089 | B2 | 4/2008 | Tehrani et al. | |
| 7,583,764 | B2 * | 9/2009 | Ramasubramanian et al. | 375/343 |
| 7,636,404 | B2 * | 12/2009 | Guo et al. | 375/343 |
| 7,804,884 | B2 * | 9/2010 | Aytur et al. | 375/136 |
| 2003/0136531 | A1 * | 7/2003 | Edwards et al. | 162/111 |
| 2004/0042536 | A1 * | 3/2004 | Rowitch et al. | 375/150 |
| 2004/0235439 | A1 * | 11/2004 | Husted et al. | 455/136 |
| 2006/0109809 | A1 * | 5/2006 | Kao et al. | 370/328 |
| 2008/0159123 | A1 | 7/2008 | Tehrani et al. | |
| 2009/0213947 | A1 * | 8/2009 | Rao et al. | 375/260 |
| 2009/0323865 | A1 * | 12/2009 | Bradley et al. | 375/330 |
| 2010/0061262 | A1 * | 3/2010 | Awater et al. | 370/252 |
| 2010/0067625 | A1 * | 3/2010 | Sankabathula et al. | 375/345 |
| 2011/0255433 | A1 * | 10/2011 | Roh et al. | 370/252 |

OTHER PUBLICATIONS

U.S. Appl. No. 10/666,723, Zeng, Chaohuang et al.

* cited by examiner

*Primary Examiner* — Shuwang Liu
*Assistant Examiner* — Helene Tayong
(74) *Attorney, Agent, or Firm* — DeLizio Gilliam, PLLC (57) ABSTRACT

A mechanism for weak signal packet detection in a wireless receiver. Cross-correlation and self-correlation operations are performed on a plurality of short training field symbols associated with a plurality of RF signals received at a plurality of receiver chains of the wireless receiver. A plurality of self-correlation outputs generated in the plurality of receiver chains are summed and the sum of the self-correlation outputs is accumulated over a predetermined number of STF symbol periods. A moving sum operation is performed on the accumulation output when the accumulation output is greater than a first predetermined threshold. A signal indicating a data packet has been detected is generated when the moving sum output is greater than a second predetermined threshold.

17 Claims, 9 Drawing Sheets

WEAK SIGNAL DETECTION IN WIRELESS COMMUNICATION SYSTEMS

BACKGROUND

Embodiments of the inventive subject matter generally relate to the field of wireless communication networks, and more particularly, to techniques for weak signal packet detection.

Wireless communication systems can use one or more channels to transfer data between a transmitter and receivers. These communication systems can operate according to a set of standards, defined by the Institute of Electrical and Electronics Engineers (IEEE) 802.11 committee, for Wireless Local Area Network (WLAN) communication. 802.11a is a part of the IEEE 802.11 specification and defines transmission standards to support a bandwidth of 20 MHz and a data rate up to 54 Mbps, by using the 5 GHz frequency spectrum. 802.11a standards define a modulation and coding scheme, a packet format including a preamble and a payload, and other guidelines to enable effective transmission and to minimize interference with other transmitting devices.

SUMMARY

Various embodiments are disclosed of a method and apparatus for weak signal packet detection. In one embodiment, cross-correlation and self-correlation operations are performed on a plurality of short training field (STF) symbols associated with a plurality of RF signals received at a plurality of receiver chains of a wireless receiver. A plurality of self-correlation outputs generated in the plurality of receiver chains are summed and the sum of the self-correlation outputs is accumulated over a predetermined number of STF symbol periods. A moving sum operation is performed on the accumulation output when the accumulation output is greater than a first predetermined threshold. A signal indicating a data packet has been detected is generated when the moving sum output is greater than a second predetermined threshold.

BRIEF DESCRIPTION OF THE DRAWINGS

The present embodiments may be better understood, and numerous objects, features, and advantages made apparent to those skilled in the art by referencing the accompanying drawings.

DESCRIPTION OF THE EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, well-known instruction instances, protocols, structures, and techniques have not been shown in detail in order not to obfuscate the description.

A transmitted radio frequency (RF) signal typically travels by multiple paths (e.g., line of sight, reflecting off one or more objects in its path, etc.) as it passes through a communication channel (e.g., free space). The transmitted signal may be corrupted by noise, interfere with other signals, and get attenuated before it is received by a receiver unit comprising one or more receiver chains. The transmitted RF signal typically includes one or more training symbols to enable the receiver unit to detect and receive an incoming RF signal. However, sometimes, the strength of the incoming RF signal may be close to the strength of noise signals. Therefore, when a weak RF signal is received, typical packet detection techniques (e.g., packet detection based on an increase in the strength of the received RF signal) may not be able to detect the RF signal over the noise signals. When the received signal's SNR (signal to noise ratio) is low, packet detection may be less reliable, packet detection errors may be significant, and this may limit receiver performance. Improper packet detection can also cause inaccuracies in timing and frequency offset estimation. Weak signal detection techniques that can detect a weak received signal in the presence of strong noise signals can help ensure that the receiver unit acquires a good estimate of a start of the received signal's preamble. This may prevent the received weak RF signal from being discarded as noise and information symbols from being lost. Furthermore, these weak signal detection techniques can improve symbol timing estimates and minimize receiver performance degradation.

Figure 1:
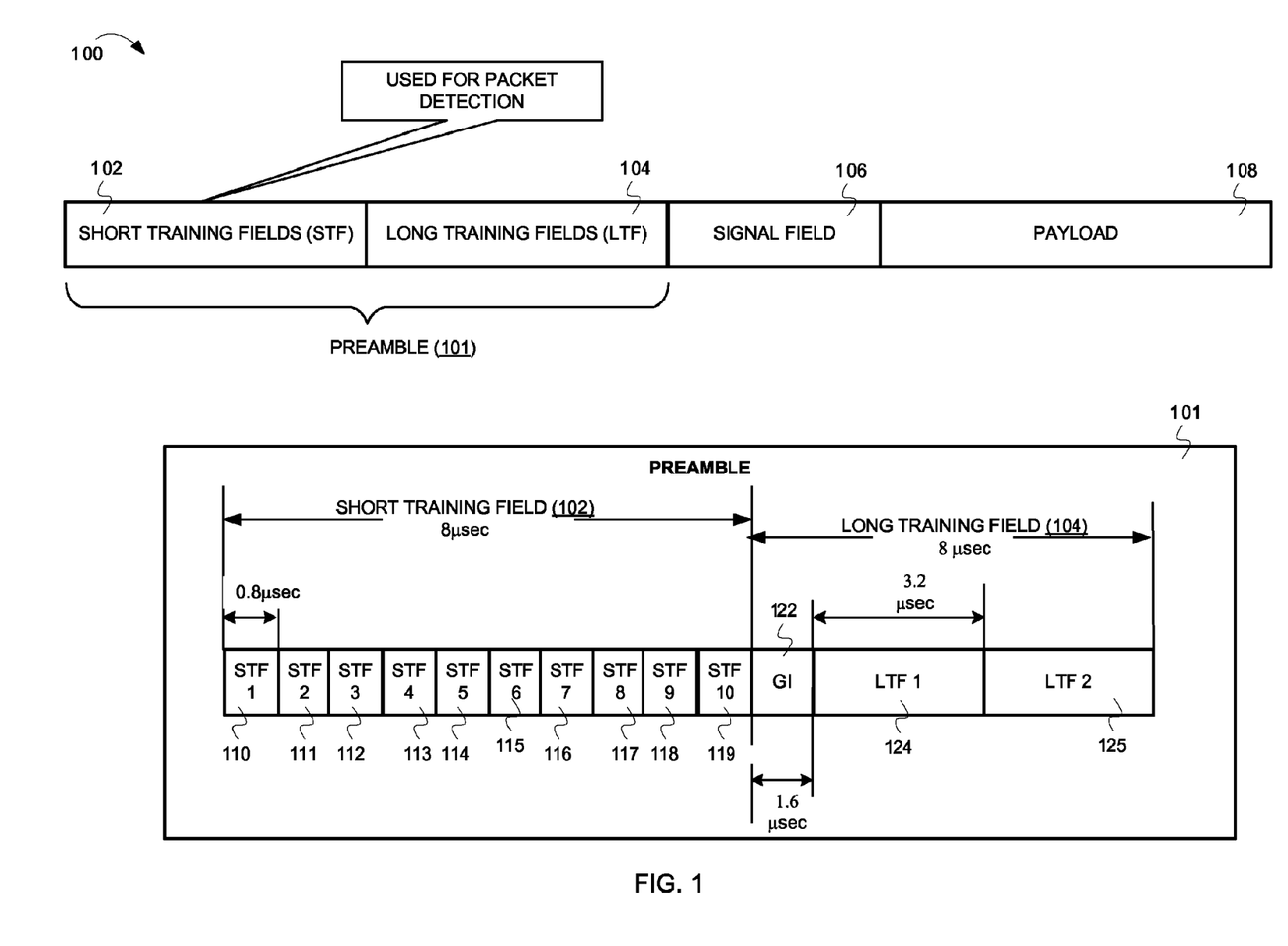
FIG. 1 illustrates an exemplary format of a packet transmitted using 802.11a standards.

Wireless communication systems used to transmit and receive the RF signals can operate according to a set of standards, defined by the Institute of Electrical and Electronics Engineers (IEEE) 802.11 committee, for Wireless Local Area Network (WLAN) communication. 802.11a is a part of the IEEE 802.11 specification and defines transmission standards to increase network throughput and support bandwidths of up to 54 Mbps. FIG. 1 illustrates an exemplary format of a packet transmitted using 802.11a standards. As shown in FIG. 1, the IEEE 802.11a packet typically includes a preamble 101, a signal field 106, and a payload 108.

The preamble 101 comprises short training fields (STF) 102, and long training fields (LTF) 104. The short training field (STF) 104 is 8 microseconds long and comprises ten short training symbols—STF1 through STF 10 (110-119). Each STF training symbol (e.g., 110) is 0.8 microseconds long. The short training fields 102 are used for frequency offset estimation, timing offset estimation, and packet detection. In some variations, the short training fields 102 can also be used for synchronization and automatic gain control (AGC) training.

The long training field (LTF) 104 is also 8 microseconds long and comprises two long training symbols—LTF1 (124) and LTF 2 (125). The long training field also comprises a guard interval (GI) 122 between STF 10 (119) and LTF 1 (124). The long training symbols (124 and 125) are 3.2 microseconds long while the guard interval 122 is 1.6 microseconds long. The LTF symbols (124 and 125) are used for channel estimation. In some variations, the LTF symbols may also be used for frequency offset estimation and timing offset estimation. The signal field 106 comprises information defining the data rate and packet length. For example, the signal field 106 can indicate the packet's modulation and coding scheme (e.g., type of modulation, coding rate, etc.), number of data bytes in the payload, parity bits, etc.

The payload 108 can include information symbols, a service field (used for scrambler initialization), pad bits, tail bits (e.g., to indication the end of transmission), etc. The payload 108 can comprise any suitable number of information symbols. It should be noted that the packet format described in FIG. 1 is exemplary. The number and length of short training fields, long training fields, and signal fields and their order of occurrence in the packet may vary depending on the mode of operation.

Figure 2:
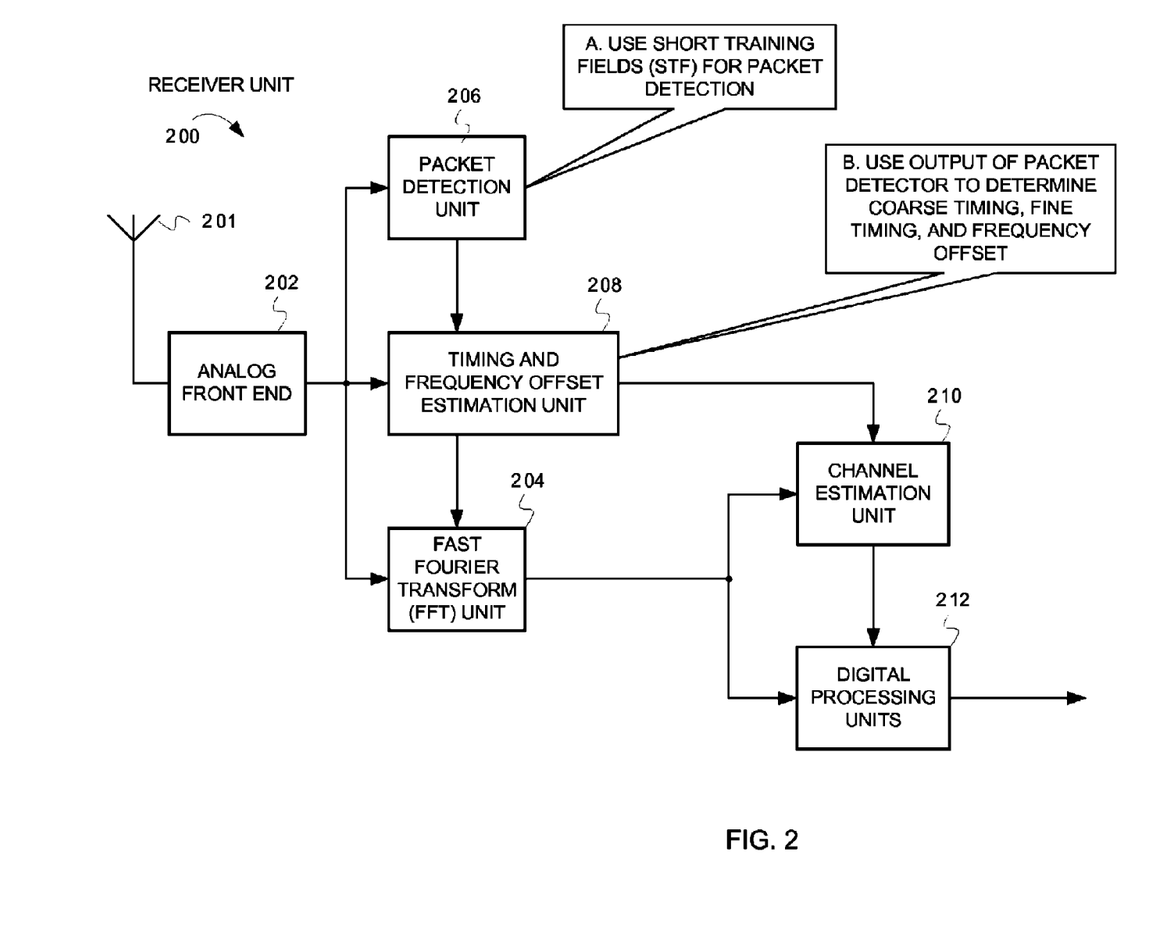
FIG. 2 is an example block diagram of a receiver unit comprising a mechanism for weak signal detection.

FIG. 2 is an example block diagram of a receiver unit 200 comprising a mechanism for weak signal detection. As shown in FIG. 2, the receiver unit 200 comprises an antenna 201 and an analog front end (AFE) 202. The AFE 202 is coupled with a Fast Fourier Transform (FFT) unit 204, a packet detection unit 206, and a timing and frequency offset estimation unit 208. The timing and frequency offset estimation unit 208 and the FFT unit 204 are coupled with a channel estimation unit 210. The FFT unit 204 and the channel estimation unit 210 are coupled with digital processing units 212.

The antenna 201 receives RF signals and provides the received RF signals to the analog front end 202. The analog front end 202 can include 1) one or more amplifying stages to amplify the received RF signal, 2) one or more filtering stages to remove unwanted bands of frequencies, 3) mixer stages to down-convert the received RF signal, 4) an automatic gain control (AGC) unit to adjust the gain to an appropriate level for a range of received signal amplitude levels, 5) an analog to digital converter (ADC) to convert the received RF signal into a digital signal, etc. After the received RF signal is converted into its digital representation, the FFT unit 204 converts the time domain digital received signal into a frequency domain signal. The packet detection unit 206 uses the short training fields (STF) in the received signal's preamble to detect an incoming packet (indicated in stage A). The packet detection unit 206 can use a combination of cross correlation (with a known STF symbol) and self-correlation to detect the incoming packet. After the packet detection unit 206 detects a packet, the timing and frequency estimation unit 208 may use the short training fields (STFs) and/or the long training fields (LTFs) to determine a carrier frequency offset and a timing offset in the received signal (indicated in stage B). The carrier frequency offset and the timing offset may be caused by a slight difference between crystal frequency generators on the receiver and transmitter.

The frequency domain signal from the FFT unit 204 and the timing offset and carrier frequency offset from the timing and frequency offset estimation unit 208 are fed to the channel estimation unit 210. The channel estimation unit 210 can use the long training fields (LTF) to estimate channel coefficients and channel response. The digital processing units 212 can use the frequency domain signal from the FFT unit 204 and the channel estimates from the channel estimation unit 210 to further process the received symbols, and retrieve one or more information symbols. In one embodiment, the digital processing units 212 can include a demodulator, a deinterleaver, a decoder, and other digital components depending on the encoding applied before transmission. It should be noted that one or more of the blocks comprising receiver unit 200 may be implemented in software and/or hardware. In FIG. 2, although the receiver unit 200 is depicted with one receiver chain, the receiver unit 200 can have any number of receiver chains and can also include processing units to combine the outputs from various receiver chains, to determine information symbols (e.g., see FIG. 3).

Figure 3:
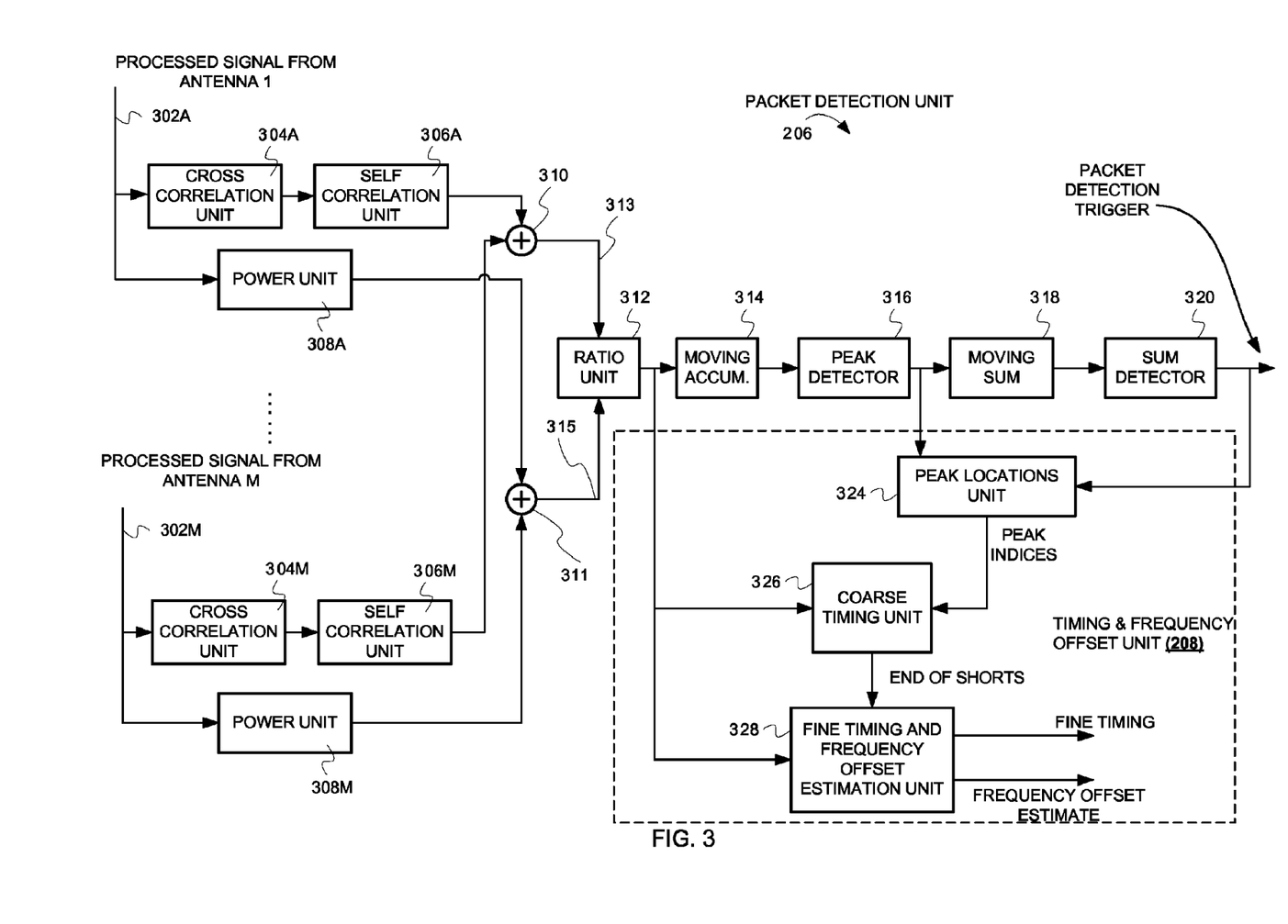
FIG. 3 is an example block diagram of a packet detection unit for implementing weak signal packet detection.

FIG. 3 is an example block diagram of the packet detection unit 206 for implementing weak signal detection. The system in FIG. 3 comprises M receiver chains. As described earlier, an analog front end may process a received RF signal. In FIG. 3, the packet detection unit 206 comprises M chains. In each receiver chain, the signal (302A . . . 302M), received from previous processing blocks, is fed to a cross-correlation unit (304A . . . 304M) and a power unit (308A . . . 308M). The cross-correlation unit in each receiver chain (304A . . . 304M) is coupled with a self-correlation unit (306A . . . 306M). The outputs from the self-correlation unit (e.g., 306A), in each of the M receiver chains, are added using adder 310. Likewise, the outputs from the power units (e.g., 308M), in each of the M receiver chains, are added using adder 311. A ratio unit 312 divides the output of adder 310 by the output of adder 311, thus weighting the sum of the self-correlated outputs. The ratio unit 312 is coupled with a moving accumulator unit 314, a peak detector 316, a moving sum unit 318, and a sum detector 320. FIG. 3 also illustrates an example block diagram of the timing and frequency offset estimation unit 208, including a peak locations unit 324, a course timing unit 326, and a fine timing and frequency offset estimation unit 328. The outputs of the peak detector 316 and the sum detector 320 are stored in the peak locations unit 324. The output of the ratio unit 312 and the output of the peak locations unit 324 are fed into the coarse timing unit 326, which can be used to detect a transition from short training fields to long training fields. The outputs of the coarse timing unit 326 and the ratio unit 312 are fed to a fine timing and frequency offset estimation unit 328.

In some embodiments, the processed signal (302A . . . 302M) comprises samples of short training symbols. The cross-correlation unit (e.g., 304A) performs a cross-correlation between the received short training symbols (e.g., 302A) and a known short training symbol. The self-correlation unit 306A performs a self-correlation between the symbols received from block 304A and a delayed version of the symbols from block 304A. Performing cross-correlation can decrease the noise power of the received signal. Performing self-correlation may allow the receiver unit to detect periodic received signals with a predefined periodicity, e.g., 0.8 microseconds (i.e., the period of the short training symbols). The power unit (e.g., 308A) computes the power of the received short training symbols (e.g., 302A) in each receiver chain. The adders 310 and 311 sum the outputs, in all the receiver chains, of the self-correlation units (306A . . . 306M) and power units (308A . . . 308M), respectively. The ratio block 312 weights the summed self-correlated signal 313 by dividing the signal 313 by the summed output of the power units (output 315).

The moving accumulator unit 314 sums the weighted signal (i.e., output of block 312) over a predetermined number of samples at a pre-determined interval or stride, which can improve the signal to noise ratio (SNR). The moving accumulator unit 314 may be a 4-tap, 32-stride accumulator, which receives four inputs (i.e., samples) where the spacing between each input is samples (as described by Eq. 5). The peak detector 316 determines and locates peaks, in the accumulated ratio (i.e., output of block 314), such that the peaks' signal strength is greater than a first predetermined threshold. The moving sum unit 318 computes the sum of peaks in previous samples. The sum detector 320 compares the output of the moving sum unit 318 with a second predetermined threshold. The sum detector 320 generates a "packet detection" trigger if the output of the moving sum unit 318 is greater than the second threshold.

When the sum detector 320 generates a trigger indicating packet detection, the peak locations (at the output of the peak detector 316) are recorded in the peak locations unit 324. The recorded peak locations (peak indices) are used for timing estimation and frequency offset estimation. The coarse timing unit 326 receives peak indices from the peak locations unit 324 and uses the weighted ratio from the ratio unit 312 to determine a coarse timing estimate. For coarse timing, the coarse timing unit 326 may divide the accumulated ratio from the ratio unit 312 into blocks with 32 samples and sum the peaks specified by the peak locations (from the peak locations unit 324) in each block. It is noted, however, that in other implementations the coarse timing unit 326 can divide the accumulated ratio into any suitable size of blocks with any suitable number of samples per block. In some implementations, the coarse timing unit 326 determines block sizes such that 1) the sum of peaks in each block is almost constant during the length of the short training field, and 2) the sum of peaks decreases towards the end of the short training field. The coarse timing unit 326 can compare the sum of peaks in each block with a third predetermined threshold and estimate a crossover point that indicates the end of the short training fields. The coarse timing unit 326 can determine a transition boundary between the short and long training fields. The coarse timing unit 326 may trigger the fine timing and frequency offset estimation unit 328 at the transition boundary.

The fine timing and frequency offset estimation unit 328 may be used to determine inter-symbol boundaries and a frequency offset estimate. For fine timing, the fine timing and frequency offset estimation unit 328 may sum the 32 sample blocks up to the crossover point and choose the maximum peak as a fine tuning point. The fine timing and frequency offset estimation unit 328 may use the fine tuning point and information from the coarse timing unit 326 (e.g., transition boundary between short and long training fields), determine inter-symbol boundaries for proper sampling of the received RF signal, and detect a start of the long training fields (LTF). A timing estimate may be calculated as a sum of the coarse timing and fine timing estimate. In some implementations, the fine timing and frequency offset estimation unit 328 may determine the angle of the weighted ratio, at the timing offset estimate, from the ratio unit 312 to estimate the frequency offset.

The block diagram in FIG. 3 is exemplary and should not be used to limit the embodiments. For example, although in some implementations the moving accumulator unit 314 can be a four-tap, 32-stride accumulator, the moving accumulator unit 314 can operate over any suitable number of samples. Likewise, the moving sum unit 318 can operate over any suitable number of samples. Additionally, in FIG. 3, weak signal detection using a combination of cross-correlation and self-correlation may be run in addition to one or more other packet detection schemes (e.g., strong signal detection, self correlation detection, etc.).

Figure 4A:
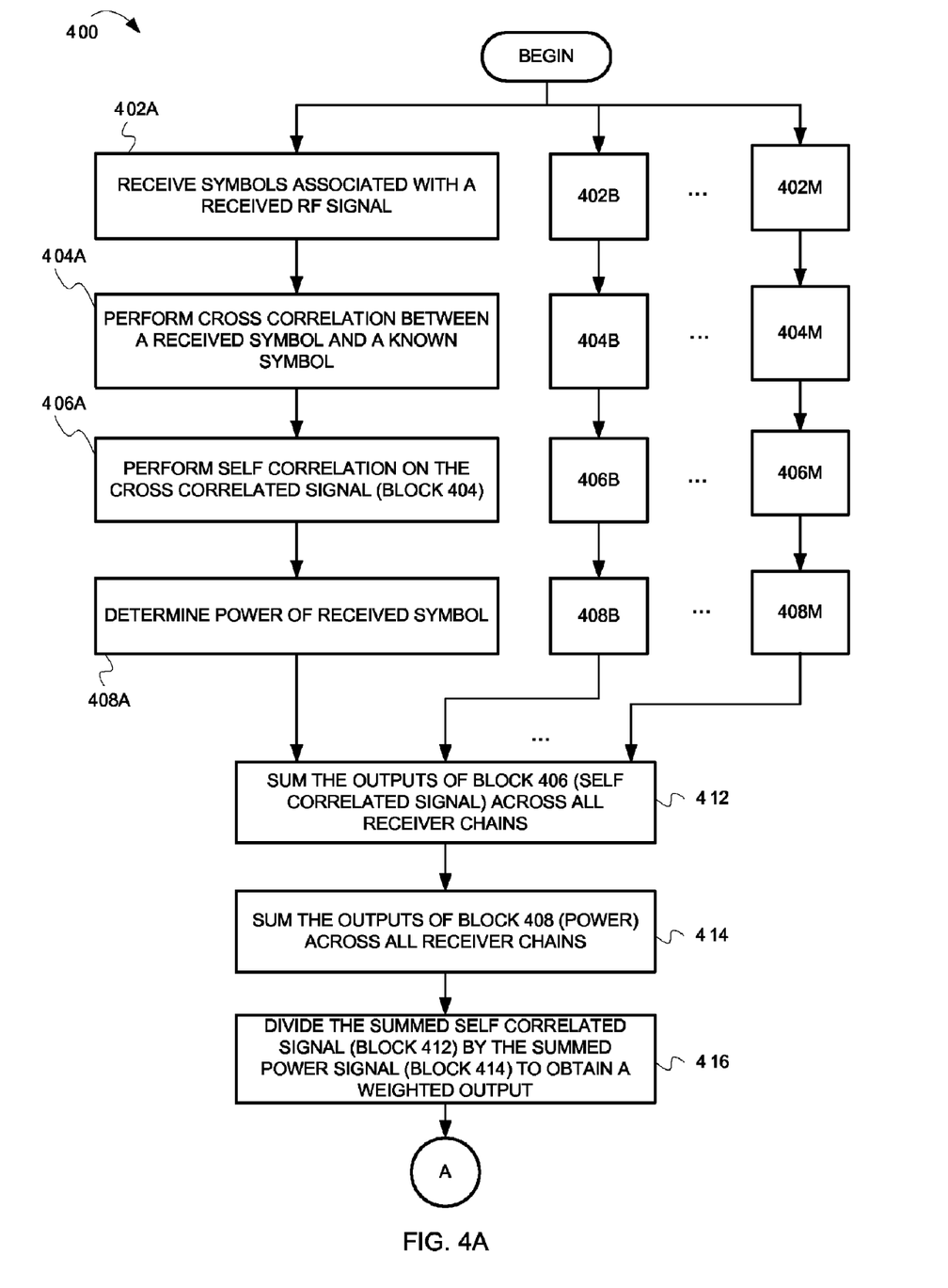
FIG. 4A is a flow diagram illustrating example operations for weak signal detection.

FIG. 4A is a flow diagram illustrating example operations for weak signal detection. The flow 400 depicts operations for a receiver unit with M receiver chains. The flow 400 begins at block 402A, 402B . . . 402M.

At block 402A, symbols associated with a received RF signal are received. The received symbols may be short training symbols associated with the received RF signal. In some implementations, samples of the received symbols may be acquired from one or more previous processing blocks (e.g., amplifying stages, mixer units, an analog to digital converter, an FFT unit, etc). Blocks 402A, 402B . . . 402M represent operations performed by each of the M receiver chains. Blocks 402B-402M perform operations similar to the operations of block 402A. Typically, each receiver chain receives a variation of a transmitted RF signal. The symbols associated with the RF signals acquired by each receiver chain may vary depending on the path (from the transmitter to the receiver chain antenna) followed by the RF signal. From blocks 402A, 402B . . . 402M, the flow continues at blocks 404A, 404B . . . 404M respectively.

At block 404A, cross-correlation between the received short training symbols and a known short training symbol is performed, e.g., by the cross-correlation units 304A-304M. Cross-correlation is typically used as a measure of similarity between two signals. Cross-correlation between the received short training symbol and a known short training symbol can determine the difference between the received training symbol and the known training symbol. Cross-correlation involves shifting the known training symbol (or the received training symbol) and multiplying the shifted symbol with the other symbol. The cross-correlation result can be represented by Eq. 1, where, $y_i$, $x_i$, and $s_i$ are samples of the cross-correlation result, the received short training symbol, and the known symbol respectively. Also s* denotes the complex conjugate of s and N denotes the number of samples per received symbol.

$$y_i = \sum_{k=0}^{N-1} x_{i-k} \cdot s_k^* \quad \text{(Eq. 1)}$$

It is noted that in some implementations the cross-correlator can be embodied as a sliding window correlator with N taps.

Figure 5:
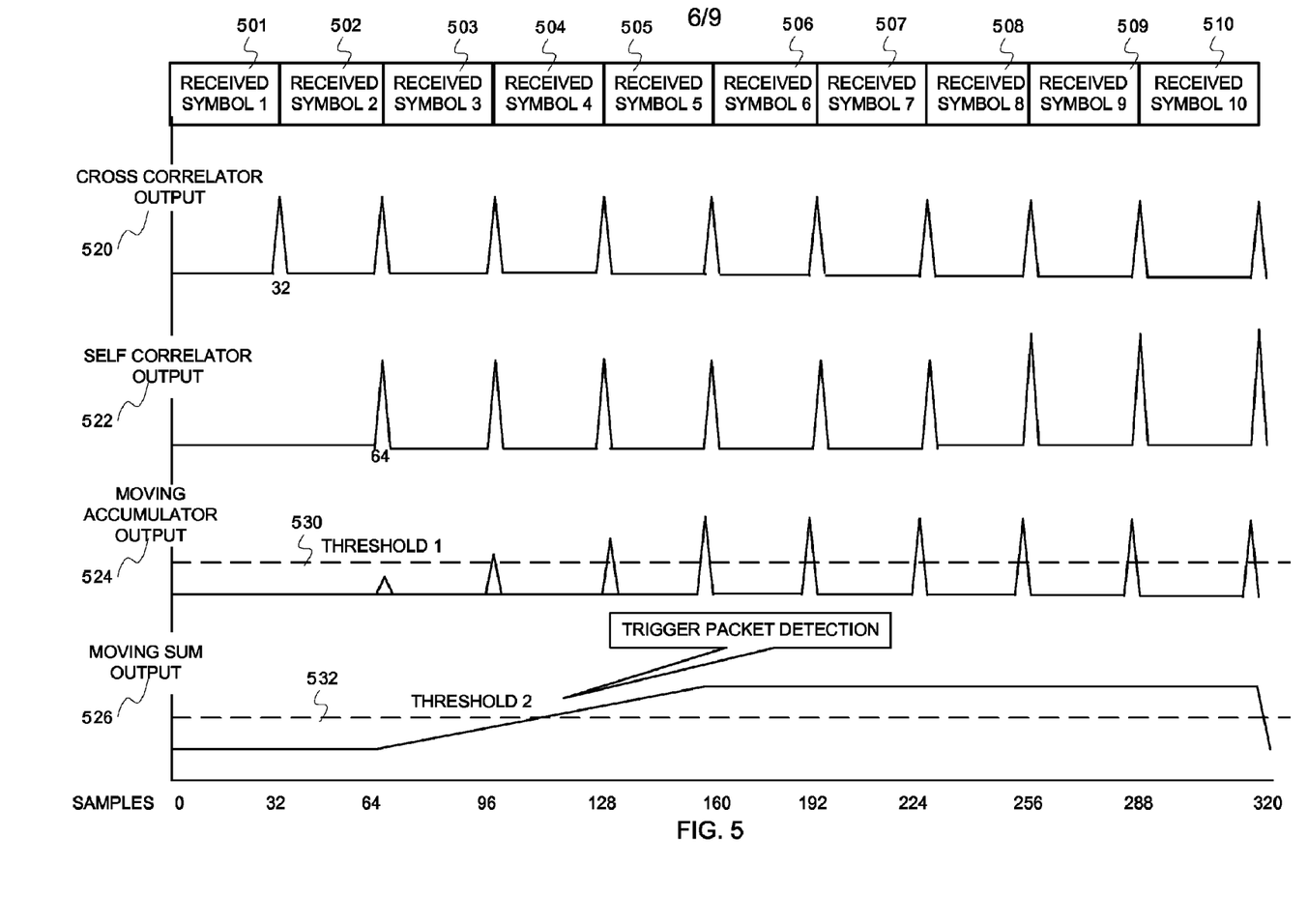
FIG. 5 is a timing diagram illustrating exemplary outputs at different stages of weak signal detection.

FIG. 5 is a timing diagram illustrating exemplary outputs at different stages of weak signal detection. FIG. 5 depicts ten received symbols—received symbol 1 through received symbol 10 (501-510). Each received symbol (e.g., 501) comprises 32 samples. The figure also illustrates, at various sampling instants, a cross-correlator unit output 520, a self-correlator unit output 522, a 4-tap, 32-stride moving accumulator output 524, and a moving sum output 526. In some implementations, each of the ten received short training symbols is the same and a known short training symbol is cross-correlated with the received symbols. The short training symbols have a self-correlating property. Therefore, when the received short training symbol is cross-correlated with a known short training symbol, noise is reduced. Because cross-correlation is a measure of similarity between the two symbols, the cross-correlation output has a maximum value when the two symbols (i.e., the received symbol and the known symbol) are exactly aligned. Therefore, in this example, the cross-correlator output waveform 520 depicts peaks every 32 samples. Although the cross-correlator outputs 520 at other sample points are shown to be constant, these values may not be constant, and may have a zero, negative or positive value. However, the cross-correlator outputs at the other sample points (not at the peaks) are typically less than the peak value. Referring back to FIG. 4A, blocks 404B-404M perform operations similar to the operations of block 404A. From blocks 404A, 404B . . . 404M, the flow continues at blocks 406A, 406B . . . 406M respectively.

At block 406A, self-correlation is performed on the cross-correlated signal (output of block 404), e.g., by the self-correlation units 306A-306M. Self-correlation is a correlation performed between a symbol (e.g., a series of samples of the symbol) and a time-delayed version of the same symbol. Self-correlation can also ensure that the outputs of the self-correlator units at each receiver chain are in phase. Self-correlation also removes the impact of frequency offset at each receive chain. This allows coherent combining of the self-correlated signals. The self-correlation output can be represented by Eq. 2, where, $y_i$ and $x_i$ are samples of the self-correlation result and the cross-correlated received symbol, respectively. Also x* denotes the complex conjugate of x and N denotes the number of samples per received symbol.

$$y_i = x_i \cdot x_{i-N}^* \qquad (Eq. 2)$$

In FIG. 5, the self-correlator output waveform is represented by waveform 522. Because self-correlation is performed on the cross-correlation unit output 520, the self-correlator output has a maximum value when the cross-correlation peaks are aligned. In example of FIG. 5, the first cross-correlation peak occurs at sample 32. The peaks of the cross-correlator output and a shifted version of the cross-correlator output are aligned at sample 64. The first self-correlation peak occurs at sample 64. As described earlier, the values at sample points (other than the peak sample points) may not be constant but are typically less than the peak value. Referring back to FIG. 4A, blocks 406B-406M perform operations similar to the operations of block 406A. From blocks 406A, 406B ... 406M, the flow continues at blocks 408A, 408B ... 408M respectively.

At block 408A, the power of the received symbol is determined, e.g., by the power units 308A-308M. If N is the number of samples used to perform cross-correlation and self-correlation, received symbol power is typically calculated over 2N samples. The received short training symbol power can be computed using Eq. 3, where, $y_i$ and $x_i$ are samples of the computed received symbol power and the received symbol, respectively. Also x* denotes the complex conjugate of x and N denotes the number of samples over which power is computed.

$$y_i = \sum_{k=0}^{N-1} x_{i-k} \cdot x_{i-k}^* \qquad (Eq. 3)$$

It is noted that the received signal power, cross-correlation and self-correlation may be calculated over any suitable number of samples. The number of samples may be dependent on the sampling rate of the received signal. Blocks 408B-408M perform operations similar to the operations of block 408A. From block 408A, 408B ... 408M, the flow continues at block 412.

At block 412, a sum of the self-correlated outputs across all receiver chains is determined. For example, the sum of outputs at blocks 406A, 406B ... 406M is determined. As described earlier, performing self-correlation at each of the receiver chains produces co-phase outputs allowing for coherent combining. In some implementations, the self-correlation output at each receiver chain may be weighted by a gain (e.g., determined based on received signal strength) before adding the weighted self-correlation outputs from each receiver chain. Weighting the self-correlated outputs at each of the receiver chains can ensure that signals from all the receiver chains are optimally combined. The flow continues at block 414.

At block 414, a sum of power outputs across all receiver chains is determined. For example, the sum of outputs at blocks 408A, 408B ... 408M is determined. In some implementations, the power output at each receiver chain may be weighted by a gain (e.g., determined based on received signal strength) before adding the weighted power outputs from each receiver chain. The flow continues at block 416.

At block 416, the sum of self-correlated outputs across all receiver chains (determined at block 412) is weighted. Weighting of the self-correlated outputs is performed by dividing the sum of self-correlated outputs across all receiver chains by the sum of power outputs across all receiver chains (determined at block 414). The weighted result can be represented by Eq. 4, where $y_{i,self\ correlation\ output}$ and $y_{i,power\ output}$ are samples of the output of the self-correlator and the power at each receiver chain. Also, $y_{i,weighted}$ are samples of the weighted output and M is the number of receiver chains.

$$y_{weighted} = \frac{\sum_{i=1}^{M} y_{i,self\ correlation\ output}}{\sum_{i=1}^{M} y_{i,power\ output}} \qquad (Eq. 4)$$

Figure 4B:
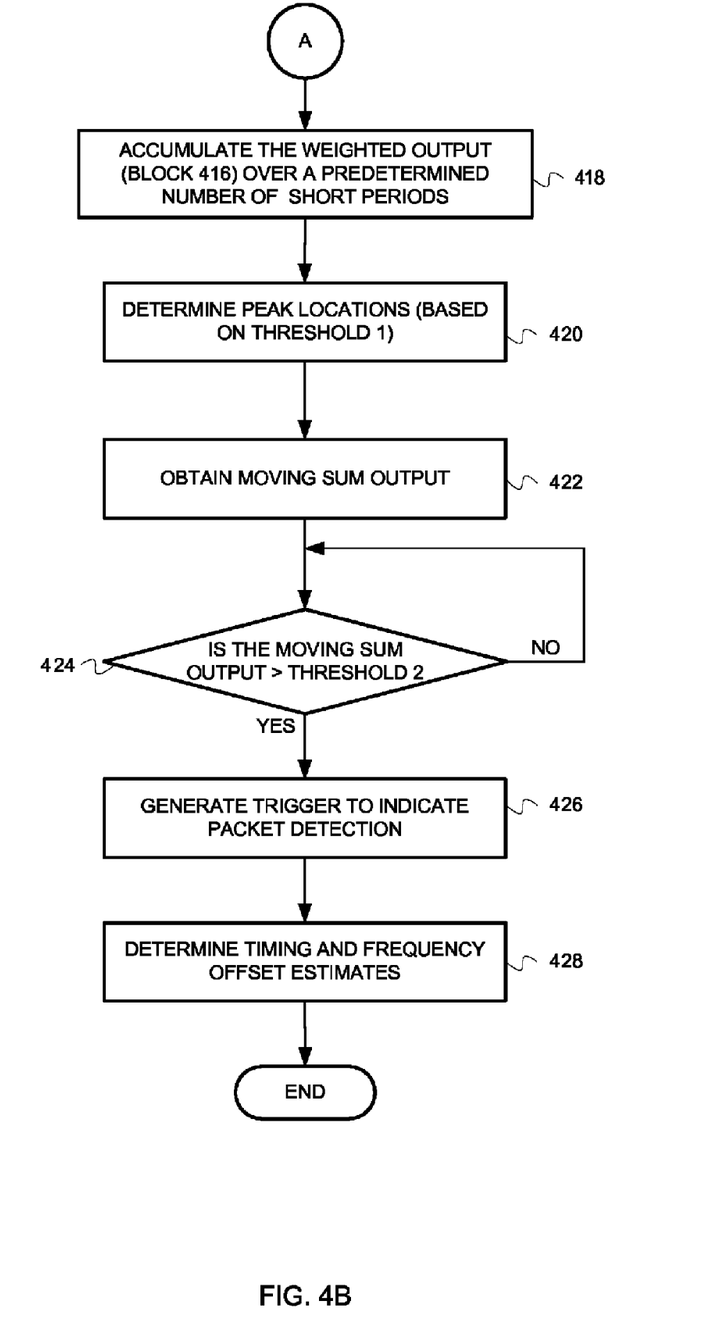
FIG. 4B is a flow diagram illustrating example operations for weak signal detection.

The flow continues at block at 418 in FIG. 4B.

At block 418, the weighted output (determined at block 416) is accumulated over a predefined number of short periods. For example, the accumulation unit 314 can perform the accumulation of the weighted output received from the ratio unit 312. This may be done to improve the signal to noise ratio (SNR). Equation 5 can represent the accumulation operation.

$$accum(N, S) \rightarrow y_i = \sum_{k=0}^{N-1} x_{i-k \cdot S} \qquad (Eq. 5)$$

In the above equation, S represents the stride of the accumulation in samples, N represents the number of strides to accumulate, and $y_i$ and $x_i$ respectively represent the samples of the accumulated output and the symbols to be accumulated. The stride (S) may also be considered as a step size. In the example shown in FIG. 5, the moving accumulator output waveform 524 is obtained by accumulating over four short periods (i.e., performing the operation accum(4,32)). This accumulator can be considered to be a 4-tap, 32-stride moving accumulator. The moving accumulator output (524) at sample 64 comprises one peak, the moving accumulator output (524) at sample 96 is a sum of two peaks (peaks at samples 64 and 96) of the self-correlator output 522. The peak in the accumulator output 524 at sample instant 160 is obtained by accumulating samples from 522 over four short periods (i.e., four peaks of the cross-correlator output, at sample instants 64, 96, 128, and 160). It is noted, however, that in some implementations the sum of self-correlator outputs across all of the receiver chains and the sum of power outputs across all of the receiver chains may be independently accumulated. After independently accumulating the summed self-correlator outputs and the summed power outputs, a ratio of the accumulated self-correlation and power values may be determined. Referring back to FIG. 4B, the flow continues at block 420.

At block 420, peak locations are determined based on a first pre-determined threshold. To determine peak locations, it is determined whether the output of the moving accumulator is greater than the first predetermined threshold. For example, the peak detector 316 can compare the output of the moving accumulator 314 to the first predetermined threshold. The first pre-determined threshold is used to identify peaks in the moving accumulator output. In some implementations, e.g., in a multipath channel, multiple peaks may exist per symbol. The operation performed at block 420 can be represented by Eq. 6, where, $x_i$ are samples of the accumulated output (determined at block 418) that is compared to the first pre-determined threshold (i.e., threshold 1).

$$y_i = \begin{cases} x_i & \text{if } |x_i| > \text{threshold 1} \\ 0, & \text{otherwise} \end{cases} \qquad \text{(Eq. 6)}$$

As depicted in Eq. 6, the accumulator output is zeroed out if no peak is detected. The peak locations can be stored (e.g., in a peak locations unit 324) and can be used to determine timing and frequency offset. From block 420, the flow continues at block 422.

At block 422, a moving sum operation is performed on the processed accumulated output (determined at block 420). For example, the moving sum unit 318 performs the moving sum operation on the processed accumulated output received from peak detection unit 316. The moving sum operation is similar to performing an accumulation over a single short period (i.e., performing the operation accum (N,1)). This accumulator can be considered to be an N-tap, 1-stride moving accumulator. The moving sum output can be represented by Eq. 7, where, $y_i$ and $x_i$ are samples of the moving sum output and the processed accumulated output (determined at block 420), respectively. N denotes the number of samples per short training symbol.

$$yi(\text{moving sum}) = \sum_{k=0}^{N-1} x_{i-k} \qquad \text{(Eq. 7)}$$

FIG. 5 depicts the moving sum output waveform 526. In FIG. 5, at each sampling instant, at least one accumulated peak is part of the moving sum output 526. Referring back to FIG. 4B, the flow continues at block 424.

At block 424, it is determined whether the moving sum output is greater than a second predetermined threshold. For example, the sum detector 320 can compare the moving sum output to the second predetermined threshold. The second pre-determined threshold can be used to prevent a false detection. In FIG. 5, the second predetermined threshold is represented by threshold 2 (532). When the moving sum output 526 exceeds threshold 2 (532), a trigger indicating a detected packet is generated. Referring back to FIG. 4B, if it is determined that the moving sum output is greater than the second predetermined threshold, the flow continues at block 426. Otherwise, the flow continues at block 424.

At block 426, a trigger to indicate packet detection is generated. The packet detection trigger may be applied to subsequent processing blocks such as a timing and frequency offset estimation unit and a channel estimation unit so that the received weak RF signal can be further processed. The flow continues at block 428.

At block 428, coarse and fine timing is determined. The weighted self-correlated signal (determined at block 416) can be used along with peak locations (determined at block 420) to determine a coarse timing estimate. The coarse timing estimate can be used to determine a transition boundary between the short and long training fields. The coarse timing estimate can also be used to determine a fine timing estimate and a frequency offset estimate. A timing estimate may be calculated as a sum of the coarse timing and fine timing estimate. Operations for timing and frequency offset estimation may be performed by the timing and frequency offset estimation unit 208 and are further described in FIG. 6. From block 428, the flow ends.

Figure 6:
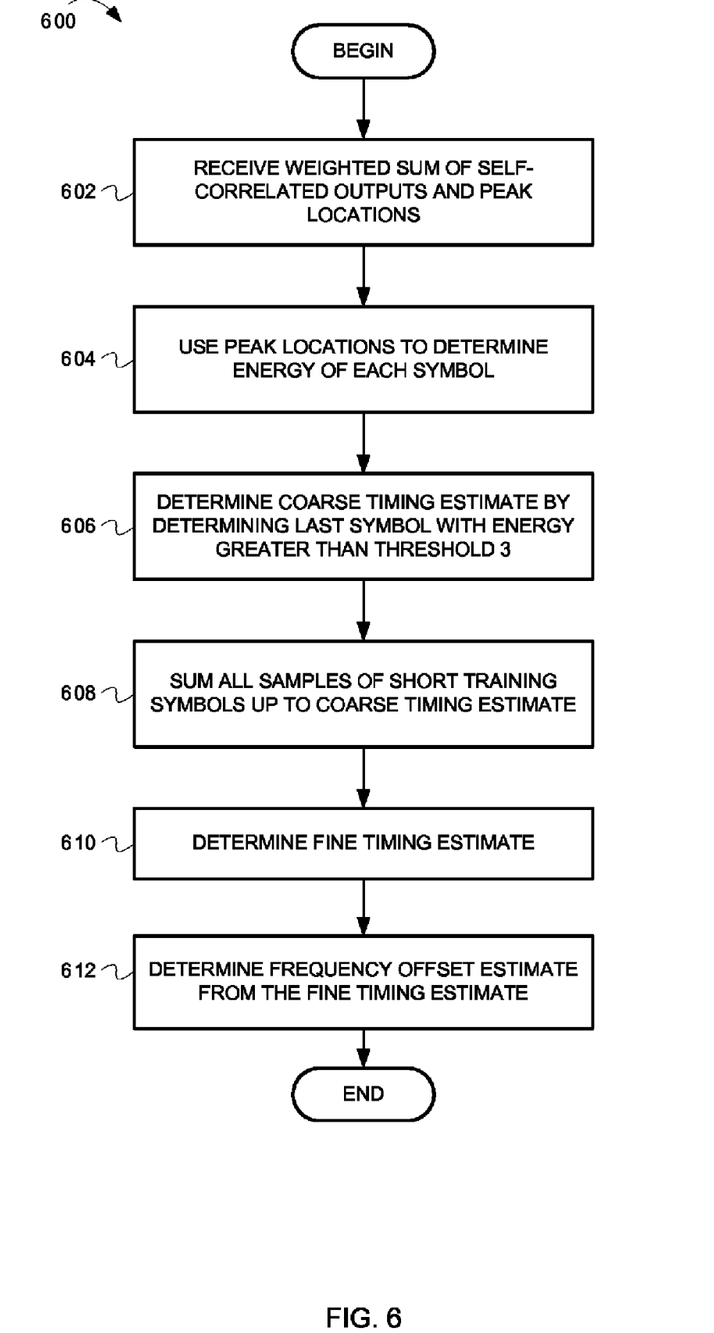
FIG. 6 is a flow diagram illustrating example operations for timing and frequency offset estimation.

FIG. 6 is a flow diagram illustrating example operations for timing and frequency offset estimation. The flow 600 begins at block 602.

At block 602, a weighted sum of self-correlated outputs and peak locations are received. Determining a coarse timing estimate includes determining a transition between shorts (short training fields) and long training fields. The weighted sum of self-correlated outputs (determined at block 416) is used along with peak locations (determined at block 420) to calculate the coarse timing estimate. The flow continues at block 604.

At block 604, the peak locations are used to determine the energy of each symbol. The weighted sum of self-correlated outputs is divided into blocks comprising 32 samples, being the number of samples per short training symbol. The energy of each peak for each of the blocks is calculated and summed in accordance with Eq. 8.

$$E(n) = \sum_{i=1}^{Np} |X_{32n+p(i)}|^2 \qquad \text{(Eq. 8)}$$

In Eq. 8, E(n) is the energy of the $n^{th}$ short training symbol, Np is the number of peaks, $X_i$ are samples of the weighted sum of self-correlated outputs, and p(i) is the location of the $i^{th}$ peak. In some implementations, there can be multiple peaks per short training symbol. The flow continues at block 606.

Figure 7:
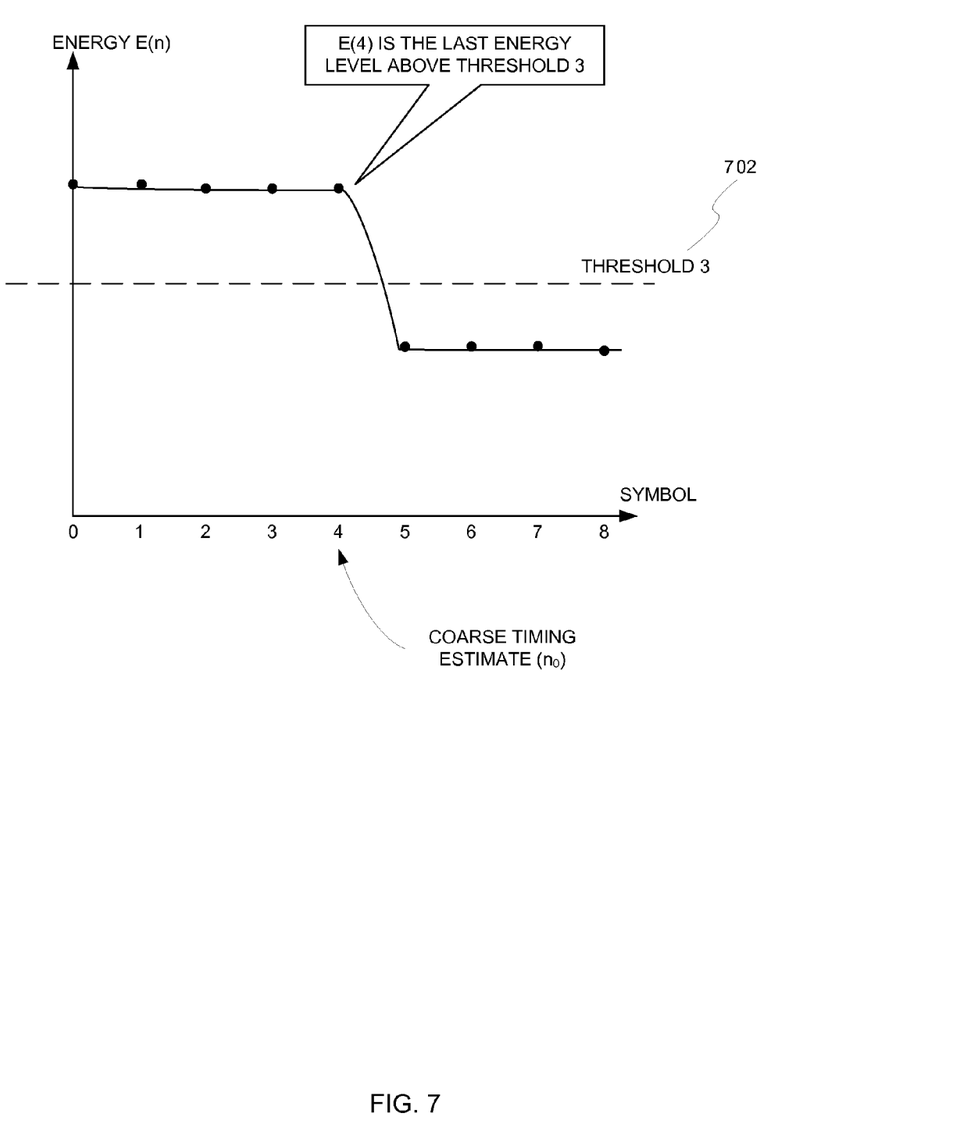
FIG. 7 illustrates an example graph of energies associated with a sequence of short training symbols for determining a coarse timing estimate.

At block 606, the coarse timing estimate is determined by determining the last symbol with an energy greater than a third pre-determined threshold. When the symbol energy (E(n)) falls below the third pre-determined threshold, the last symbol in the sequence of symbols with an energy above the third pre-determined threshold is considered to be the last short training symbol. FIG. 7 shows an example graph of energy at each of the symbols. In FIG. 7, energy E(n) represents the energy at symbol n. In FIG. 7, the energy E(0) to E(4) at symbols 0 to 4, respectively, is constant and is above threshold 3 (702). In FIG. 7, it is indicated (e.g., by the coarse timing unit 326 of FIG. 3) that E(4) is the last symbol energy above threshold 3 and that symbol 4 is the last short training symbol. In other words, the coarse timing estimate (i.e., transition between the short training fields and the long training fields ($n_0$) is determined using Eq. 9. The coarse timing estimate in terms of number of samples can be indicated as $32n_0$, where 32 is the number of samples per short training symbol. Referring to FIG. 6, the flow continues at block 608.

$$n_0 = \max_n [E(n) > \text{Threshold 3}] \qquad \text{(Eq. 9)}$$

At block 608, samples of all short training symbols, up to the coarse timing estimate, are summed. The coarse timing estimate, determined at block 606, is an approximate and granular timing estimate and is dependent on the number of samples per symbol. To determine a fine timing estimate, all the shorts up to the coarse timing estimate ($n_0$), determined at block 606, are summed. This is illustrated in Eq. 10. In Eq. 10, $y_k$ are the sum of samples per short symbol and $x_i$ are samples of the weighted sum of self-correlated outputs (determined at block 416). In other words, $y_k$ is determined by adding the $k^{th}$ sample of each short symbol, up to the coarse timing. The flow continues at block 610.

$$y_k = \sum_{n=1}^{n_0} x_{32n+k}; k \in (0, 32) \quad \text{(Eq. 10)}$$

At block 610, a fine timing estimate is determined. To estimate fine timing, the energy of the sum over all short training symbols (determined at block 608) is determined. The sample instant (k) with the largest energy corresponds to the fine timing estimate. This is illustrated in Eq. 11. In Eq. 11, the energy of the sum of the $k_o^{th}$ samples in each short training symbol has a maximum value.

$$k_0 = \max_k |y_k|^2 \quad \text{(Eq. 11)}$$

The timing offset estimate ($t_0$) is determined as a sum of the coarse timing estimate (32. $n_0$) and the fine timing estimate ($k_0$). This is illustrated in Eq. 12. The flow continues as block 612.

$$t_0 = 32n_0 + k_0 \quad \text{(Eq. 12)}$$

At block 612, a frequency offset estimate is determined from the fine timing estimate. The sum of the $k_0^{th}$ samples of each short training symbol up to coarse timing is represented as $y_{k0}$ (refer to Eq. 10). $y_{k0}$ is a complex quantity, comprises a real part (Z) and an imaginary part ($\alpha$), and is represented by Eq. 13. The frequency offset ($f_{offset}$) is estimated by calculating the angle of $y_{k0}$ as depicted in Eq. 14. From block 612, the flow ends.

$$y_{k0} = Z + j\alpha \quad \text{(Eq. 13)}$$

$$f_{offset} = \text{angle}((y_{k0})) = \text{angle}(Z + j\alpha) \quad \text{(Eq. 14)}$$

It should be understood that the depicted flow diagrams (FIGS. 4A, 4B, and 6) and the timing diagram (FIG. 5) are examples meant to aid in understanding embodiments and should not be used to limit embodiments or limit scope of the claims. Embodiments may perform additional operations, fewer operations, operations in a different order, operations in parallel, and some operations differently. For example, although FIG. 5 depicts received symbols comprising 32 samples, the received symbols can comprise any suitable number of samples. The sampling rate can be determined by a desired accuracy, limitations of digital components, etc. Similarly, although FIG. 5 depicts accumulation being performed over four short periods and moving sum operations being performed over one short period, the accumulation operations, and moving sum operations may be performed over any suitable number of samples.

Embodiments may take the form of an entirely hardware embodiment, a software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
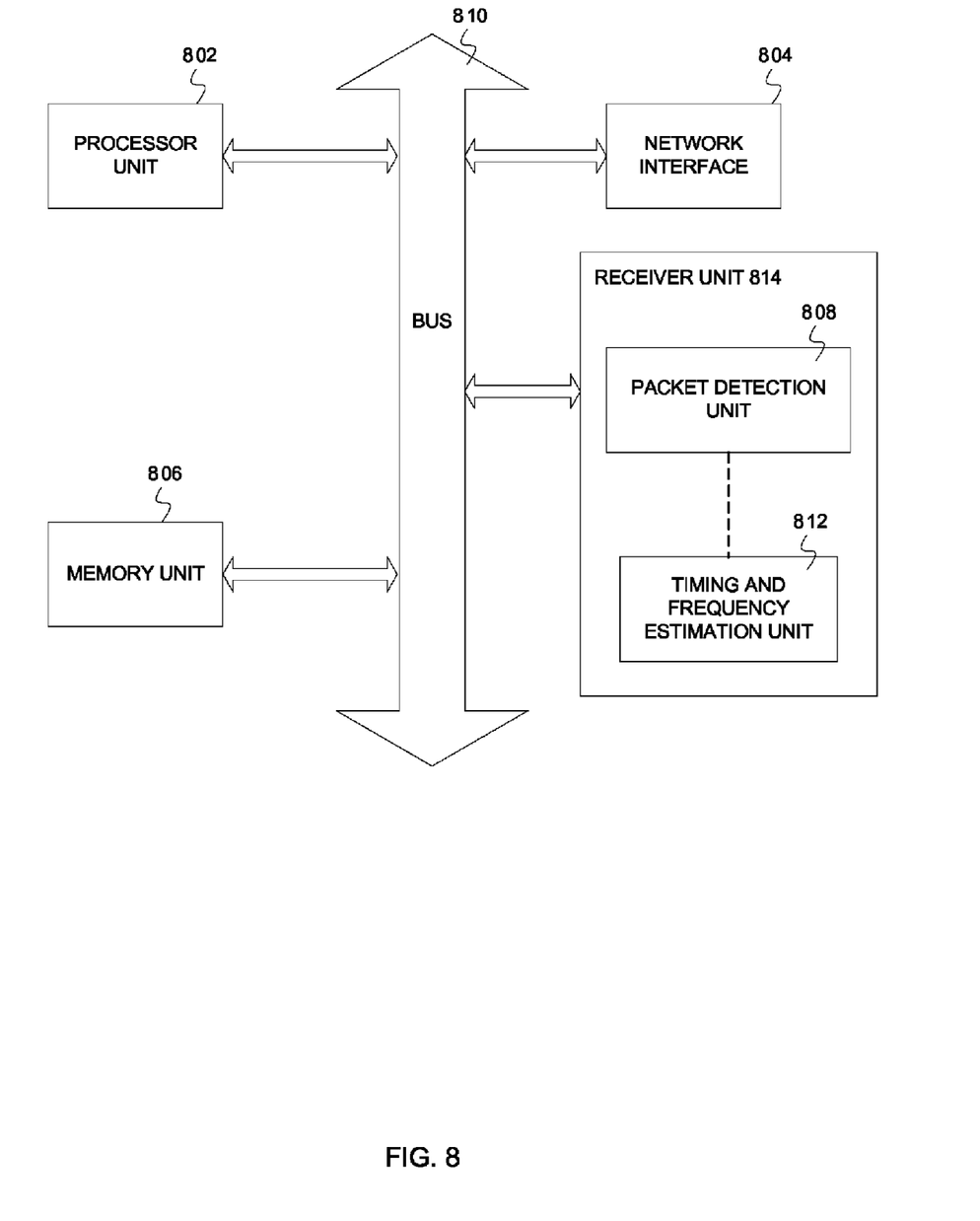
FIG. 8 is an example wireless device including a mechanism for implementing weak signal detection.

FIG. 8 depicts an example wireless device including a mechanism for implementing weak signal detection. In one implementation, the wireless device may be a WLAN device. The WLAN device includes a processor unit 802 (possibly including multiple processors, multiple cores, multiple nodes, and/or implementing multi-threading, etc.). The WLAN device includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 810 (e.g., PCI, ISA, PCI-Express, HyperTransport®, Infini-Band®, NuBus, etc.), and network interfaces 804 that include at least one wireless network interface (e.g., a WLAN interface, a Bluetooth® interface, a WiMAX interface, a ZigBee® interface, a Wireless USB interface, etc.). The WLAN device also includes a receiver unit 814 comprising a packet detection unit 808 coupled with a frequency offset and timing estimation unit 812. To detect a weak signal, the packet detection unit 808 uses a combination of cross-correlation and self-correlation on samples of received short training symbols, and performs accumulation and moving sum operations on the weighted correlation outputs, e.g., as was described above with reference to FIGS. 1-5. The timing and frequency offset estimation unit 812 can interface with the packet detection unit 808 to estimate a transition boundary between short and long training fields and a frequency offset, e.g., as was described above with reference to FIGS. 6-7. Any one of the above-described functionalities may be partially (or entirely)

implemented in hardware and/or on the processing unit 802. For example, the functionality may be implemented with an application specific integrated circuit, in logic implemented in the processing unit 802, in a co-processor on a peripheral device or card, etc. Further, realizations may include fewer or additional components not illustrated in FIG. 8 (e.g., additional network interfaces, peripheral devices, etc.). The processor unit 802 and the network interfaces 804 are coupled to the bus 810. Although illustrated as being coupled to the bus 810, the memory 806 may be coupled to the processor unit 802.

While the embodiments are described with reference to various implementations and exploitations, it will be understood that these embodiments are illustrative and that the scope of the inventive subject matter is not limited to them. In general, the weak signal detection techniques as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for implementing weak signal packet detection comprising:
    performing cross-correlation and self-correlation operations on a plurality of short training field (STF) symbols associated with a plurality of RF signals received at a plurality of receiver chains of a wireless receiver;
    summing a plurality of self-correlation outputs generated in the plurality of receiver chains;
    weighting the sum of the self-correlation outputs, wherein said weighting the sum of the self-correlation outputs comprises:
        calculating a power of the plurality of STF symbols associated with the plurality of RF signals received at the plurality of receiver chains;
        summing the calculated power outputs generated in the plurality of receiver chains; and
        dividing the sum of the self-correlation outputs by the sum of the calculated power outputs;
    accumulating the weighted sum of the self-correlation outputs over a predetermined number of STF symbol periods;
    performing a moving sum operation on the accumulation output when the accumulation output is greater than a first predetermined threshold; and
    generating a signal indicating a data packet has been detected when the moving sum output is greater than a second predetermined threshold.

2. The method of claim 1, wherein said performing cross-correlation operations comprises cross-correlating the STF symbols received at each receiver chain with a known STF symbol sequence.

3. The method of claim 2, wherein said performing self-correlation operations comprises self-correlating the cross-correlation output at each receiver chain with a delayed version of the cross-correlation output.

4. The method of claim 1, further comprising:
    identifying peak locations in the accumulation output by detecting when the accumulation output is greater than the first predetermined threshold;
    determining a coarse timing estimate and a fine timing estimate based, at least in part, on the peak locations in the accumulation output and the weighted sum of the self-correlation outputs.

5. The method of claim 1, further comprising:
    determining locations of peaks in the accumulation output, wherein the peak locations are determined by detecting when the accumulation output is greater than the first predetermined threshold;
    determining an energy associated with each symbol of a plurality of symbols from the weighted sum of the self-correlation outputs, wherein the energy associated with a symbol is determined by summing the energies at each of the peak locations associated with the symbol;
    comparing the energy associated with each symbol to a third predetermined threshold; and
    determining a course timing estimate based, at least in part, on one of the plurality of symbols from the sum of the self-correlation outputs having an energy greater than the third predetermined threshold.

6. The method of claim 5, further comprising summing sample values across the plurality of symbols from the weighted sum of the self-correlation outputs up to the coarse timing estimate, and determining a fine timing estimate based, at least in part, on a sample instant where an energy of the summed sample values has a maximum value.

7. The method of claim 6, further comprising determining a timing offset estimate by summing the fine timing estimate and a product of the coarse timing estimate and a number of samples per short training symbol.

8. The method of claim 6, further comprising determining a frequency offset estimate by calculating an angle of the summed sample values at the sample instant corresponding to the fine timing estimate.

9. A wireless receiver comprising:
    a plurality of receiver chains operable to receive a plurality of RF signals, wherein each of the receiver chains comprises a cross-correlation unit coupled to a self-correlation unit, wherein the cross-correlation units and the self-correlation units are operable to perform cross-correlation and self-correlation operations, respectively, on a plurality of short training field (STF) symbols associated with the plurality of received RF signals;
    a first summing unit operable to sum outputs of the self-correlation units in the plurality of receiver chains;
    a weighting unit operable to weight the output of the first summing unit to generate a weighted sum of the outputs of the self-correlation units, wherein the weighting unit operable to weight the sum of the self-correlation outputs comprises,
        a power unit of each of the plurality of receiver chains operable to calculate a power of each of the STF symbols received at the receiver chain;
        a second summing unit operable to sum outputs of the power units in the plurality of receiver chains; and
        the weighting unit operable to divide the sum of the outputs of the self-correlation units by the sum of the outputs of the power units to generate the weighted sum of the outputs of the self-correlation units;
    an accumulation unit operable to accumulate the weighted sum of the outputs of the self-correlation units at the output of the weighting unit over a predetermined number of STF symbol periods;
a moving sum unit operable to perform a moving sum operation on an output of the accumulation unit when the output of the accumulation unit is greater than a first predetermined threshold; and
a detection unit operable to generate a signal indicating a data packet has been detected when an output of the moving sum unit is greater than a second predetermined threshold.

10. The wireless receiver of claim 9, wherein, for each receiver chain, the cross-correlation unit of the receiver chain is operable to cross-correlate the STF symbols received at the receiver chain with a known STF symbol sequence.

11. The wireless receiver of claim 10, wherein, for each receiver chain, the self-correlation unit of the receiver chain is operable to self-correlate an output of the cross-correlation unit of the receiver chain with a delayed version of the output of the cross-correlation unit.

12. The wireless receiver of claim 9, further comprising a first peak detection unit operable to identify peak locations in the output of the accumulation unit by detecting when the accumulation unit output is greater than the first predetermined threshold.

13. The wireless receiver of claim 9, wherein each of the plurality of receiver chains further comprise an antenna operable to acquire RF signals.

14. One or more non-transitory machine-readable storage media having instructions stored therein, which when executed by one or more processors causes the one or more processors to perform operations that comprise:
performing cross-correlation and self-correlation operations on a plurality of short training field (STF) symbols associated with a plurality of RF signals received at a plurality of receiver chains of a wireless receiver;
summing a plurality of self-correlation outputs generated in the plurality of receiver chains;
weighting the sum of the self-correlation outputs, wherein said weighting the sum of the self-correlation outputs comprises:
calculating a power of the plurality of STF symbols associated with the plurality of RF signals received at the plurality of receiver chains;
summing the calculated power outputs generated in the plurality of receiver chains; and
dividing the sum of the self-correlation outputs by the sum of the calculated power outputs;
accumulating the weighted sum of the self-correlation outputs over a predetermined number of STF symbol periods;
performing a moving sum operation on the accumulation output when the accumulation output is greater than a first predetermined threshold; and
generating a signal indicating a data packet has been detected when the moving sum output is greater than a second predetermined threshold.

15. The non-transitory machine-readable storage media of claim 14, wherein the operations further comprise cross-correlating the STF symbols received at each receiver chain with a known STF symbol sequence, and self-correlating the cross-correlation output at each receiver chain with a delayed version of the cross-correlation output.

16. A wireless local area (WLAN) device comprising:
a transmitter operable to transmit RF signals via a network; and
a receiver coupled to the transmitter and operable to receive RF signals via the network, wherein the receiver comprises:
a plurality of receiver chains operable to receive a plurality of RF signals, wherein each of the receiver chains comprises a cross-correlation unit coupled to a self-correlation unit, wherein the cross-correlation units and the self-correlation units are operable to perform cross-correlation and self-correlation operations, respectively, on a plurality of short training field (STF) symbols associated with the plurality of received RF signals;
a first summing unit operable to sum outputs of the self-correlation units in the plurality of receiver chains;
a weighting unit operable to weight the output of the first summing unit to generate a weighted sum of the outputs of the self-correlation units, wherein the weighting unit operable to weight the sum of the self-correlation outputs comprises,
a power unit of each of the plurality of receiver chains operable to calculate a power of each of the STF symbols received at the receiver chain;
a second summing unit operable to sum outputs of the power units in the plurality of receiver chains; and
the weighting unit operable to divide the sum of the outputs of the self-correlation units by the sum of the outputs of the power units to generate the weighted sum of the outputs of the self-correlation units;
an accumulation unit operable to accumulate the weighted sum of the outputs of the self-correlation units at output of the weighting unit over a predetermined number of STF symbol periods;
a moving sum unit operable to perform a moving sum operation on an output of the accumulation unit when the output of the accumulation unit is greater than a first predetermined threshold;
a detection unit operable to generate a signal indicating a data packet has been detected when an output of the moving sum unit is greater than a second predetermined threshold.

17. The WLAN device of claim 16, wherein, for each receiver chain, the cross-correlation unit of the receiver chain is operable to cross-correlate the STF symbols received at the receiver chain with a known STF symbol sequence, and wherein, for each receiver chain, the self-correlation unit of the receiver chain is operable to self-correlate an output of the cross-correlation unit of the receiver chain with a delayed version of the output of the cross-correlation unit.

* * * * *